Oct. 25, 1949.　　　　　C. K. DAVIS　　　　　2,486,262
SPRAG
Filed June 18, 1945

INVENTOR.
CARL K. DAVIS
BY
Whittemore Hulbert & Belknap
ATTORNEYS

Patented Oct. 25, 1949

2,486,262

UNITED STATES PATENT OFFICE 2,486,262

SPRAG

Carl K. Davis, Detroit, Mich., assignor to The Gear Grinding Machine Company, Hamtramck, Mich., a corporation of Michigan Application June 18, 1945, Serial No. 600,055

7 Claims. (Cl. 192—45.1)

The invention relates to one-way clutches of that type in which the clutching is effected by a series of sprags arranged between concentric surfaces of coaxially arranged independently revoluble members.

It is the object of the invention to obtain a construction of sprag adapted for use in such clutches and one which can be manufactured at low cost. It is a further object to obtain a construction of sprag which is adapted to be used in clutches of different radial dimensions. It is a further object to obtain a construction of sprag which is operable with cooperating members having larger tolerance limits in the dimensions thereof.

With these and other objects in view, the invention consists in the construction as hereinafter set forth.

In the manufacture of sprags for use in clutches of the type above referred to, it has been customary to form the opposite ends of arcuate contour drawn from centers which are on opposite sides, both longitudinally and laterally of the geometric center of the structure. The radius of each curve is, therefore, longer than if drawn from the geometric center and the two curves are eccentric to each other. Thus, when the sprag is placed between concentric surfaces of independently revoluble coaxial clutch members, a relatively small angular movement of the sprag with respect to the clutch will produce locking frictional engagement. If, however, the spacing between the concentric surfaces is increased or diminished the angle of friction will be altered so that it is necessary to maintain the dimensions of both the sprag and the cooperating members within relatively small tolerance limits. It is one of the objects of my invention to obtain a construction of sprag which will operate satisfactorily with cooperating elements having larger tolerance limits in the dimensions thereof. To accomplish this, I position the centers of the curves for the opposite ends of the sprag in what might be termed the pitch circle, that is midway between the two ends, but laterally offset on opposite sides of the geometric center. With such construction a larger angular movement about the geometric center is permitted without materially changing the angle of friction with respect to the cooperating surfaces.

One-way clutches are constructed of various radial dimensions depending upon the amount of space available in the structure in which they are incorporated. In order that the same sprag may be used in clutches of different radial dimensions, I have designed a construction having a standard pitch or width along the pitch circle, but with one or both sides sharply tapered in a radially inward direction. This permits of using the sprag in a clutch of small radius without interference with adjacent sprags, while on the other hand it may be used with a clutch of much longer radius and will operate equally well. To provide symmetry, the portion of the sprag above the pitch circle is tapered correspondingly to the portion below this circle.

Figures 5, 6, 7:
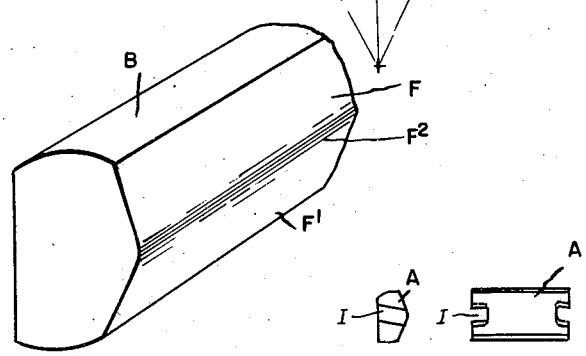
Fig. 5 is a perspective view of the fashioned bar from which the sprags are formed.
Figs. 6 and 7 are views similar to Figs. 1 and 2 showing the actual size of the sprags.

As shown in Figs. 6 and 7, the sprags are of relatively small dimensions, but to perform satisfactorily they should be made of exact contour. I have, therefore, devised a process of manufacturing the sprags from a rolled or extruded bar having a precise cross sectional contour and which may be cut into separate sections for the individual sprags. It is possible by this method to form sprags that require no further machining or finishing of the curved end contours thereof, thus greatly reducing the cost of manufacture.

Figure 1:
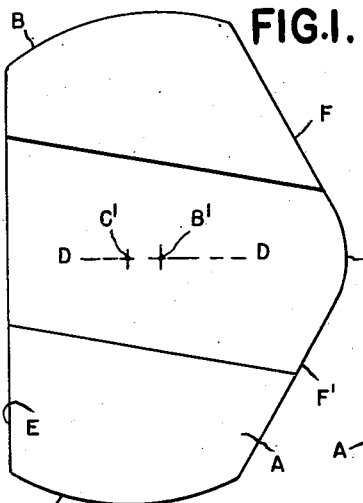
Fig. 1 is an end elevation of my improved sprag drawn to an exaggerated size.
Figure 2:
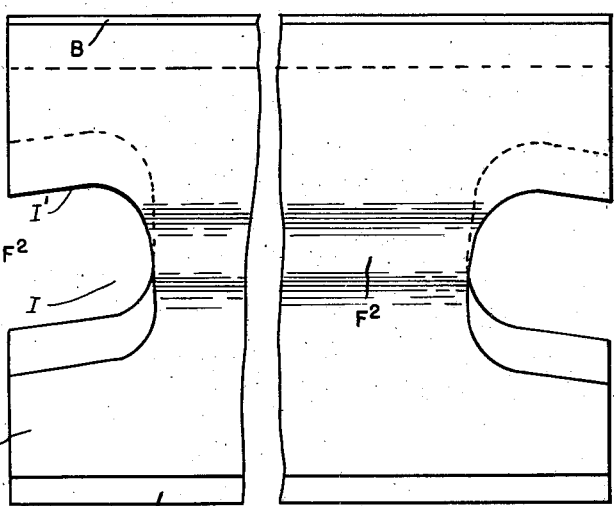
Fig. 2 is a side elevation thereof.

As specifically shown in Figs. 1 and 2, the sprag A has arcuate end contours B and C concentric respectively with points B' and C' in the pitch circle D—D which points are upon opposite sides of the center of gravity of the sprag. The side E of the sprag to the left of these centers is preferably straight throughout its length, but the side to the right has portions F and F' inclined obliquely and oppositely above and below the pitch circle at equal angles to the side E, preferably with a small radius arcuate portion $F^2$ conncecting and tangent to the adjacent ends thereof. The cross sectional contour just described can be formed in a rolled or extruded bar which is then severed into sections of the desired length. The opposite ends of each section may then be laterally channeled at I in a direction slightly oblique to the pitch circle for a purpose hereinafter described. The sprag thus formed may be heat treated to harden the same and is then ready for use. However, where great exactitude is required, the arcuate surfaces B and C may be ground and the angling surfaces F and F' together with the opposed surface E form a means for exactly positioning the sprag during these grinding operations.

Figure 3:
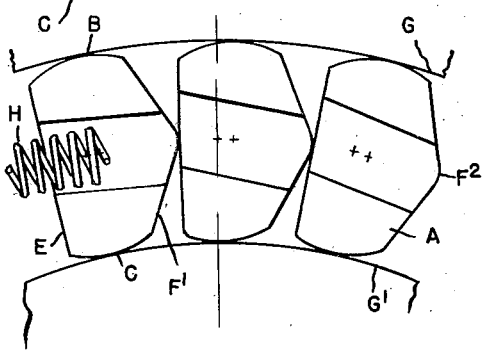
Fig. 3 is an end elevation showing a portion of an annular series of sprags in engagement with cooperating clutch members.
Figure 4:
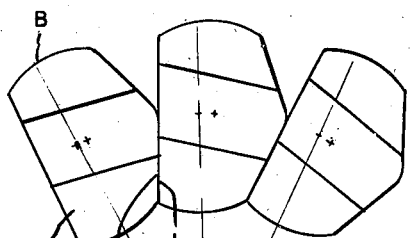
Fig. 4 is a similar view showing the same sprags in connection with cooperating clutch members of smaller radial dimensions.

As illustrated in Figs. 3 and 4, the same sprags may be used in clutches having the cooperating annular surfaces of different radial dimensions. In Fig. 3, the spaced annular surfaces G and G' between which the sprags are placed are sufficiently removed from their common center $G^2$ so that the side F' of one sprag diverges from the side E of an adjacent sprag. In Fig. 4 the radii of these concentric surfaces are shortened so that the side F' is substantially parallel to the side E of an adjacent sprag. This is the under limit of radial dimensions, but there is no upper limit to the length thereof.

In the manufacture of clutches certain tolerance limits in the dimensions of parts are permitted. Thus, the radial dimension between the inner and the outer concentric surfaces of the drive and driven members may vary within predetermined limits. Such variation will alter the inclination of the sprag when in clutching engagement but it is essential that this should not change the friction angle excessively. Due to the fact that the centers of the arcuate contours are located in the pitch circle, there is a limit imposed on the friction angle and a minimum of variation of said angle with changes in the radial dimension between the concentric surfaces which is an advantageous feature of my invention.

One important advantage resulting from the symmetrical form of the sprag is that it may be placed between the coacting surfaces in four different ways, according to the requirements of the specific clutch in which it is used. Two of these positions are obtained by reversing the sprag end for end and two other positions by reversing it from top to bottom.

The object of forming the obliquely inclined channels I in the opposite ends of the sprags is to adapt them to receive an annular radially expansible or contractible spring. This serves to bias all of the sprags towards a position of frictional engagement with the concentric surfaces. The channels I are also preferably undercut as shown at I' for retaining the annular members H from accidental displacement.

What I claim as my invention is:

1. In a one-way clutch including coaxial rotatable members having spaced concentric surfaces, a universal sprag engageable with clutches of different radial dimensions, said sprag having a predetermined width or pitch on its pitch circle, the inner and outer ends being of arcuate contour with the centers of the arcs located approximately in the pitch circle and spaced from each other, one side of said sprag being substantially parallel to a radius of the clutch from a point between said centers and the opposite side of said sprag being tapered oppositely from the pitch circle at equal angles to the radius whereby said sprag may be placed between concentric surfaces of cooperating clutch members in four different positions relative thereto respectively obtained by reversing it longitudinally and radially end for end.

2. A sprag for one-way clutches comprising a prismatic body having a straight side and a V-shaped opposite side provided with a rounded apex located opposite the radial center of the sprag and with two portions of the V at substantially equal opposite angles to said straight side.

3. A sprag for one-way clutches comprising a prismatic body having a straight side, a V-shaped opposite side provided with a rounded apex located opposite the radial center of the sprag and with the two portions of the V at substantially equal opposite angles to said straight side, and arcuate radial ends eccentric to each other.

4. A sprag for one-way clutches comprising a prismatic body having a straight side, a V-shaped opposite side provided with a rounded apex located opposite the radial center of the sprag and with the two portions of the V at equal opposite angles to said straight side, arcuate radial ends eccentric to each other, the longitudinal ends being notched to respectively receive an energizing member.

5. A sprag for one-way clutches comprising a prismatic body having a straight side, a V-shaped opposite side provided with a rounded apex located opposite the radial center of the sprag and with the two portions of the V at equal opposite angles to said straight side, arcuate radial ends eccentric to each other, the longitudinal ends being obliquely notched and undercut to respectively receive and hold an energizing member.

6. A sprag for one-way clutches comprising a prismatic body having a straight side, a V-shaped opposite side provided with a rounded apex located opposite the radial center of the sprag with the two portions of the V at substantially equal opposite angles to said straight side, and arcuate radial ends eccentric to each other and with their respective centers located midway between said ends.

7. A sprag for one-way clutches comprising a prismatic body having a straight side, a V-shaped opposite side provided with a rounded apex located opposite the radial center of the sprag with the two portions of the V at substantially equal opposite angles to said straight side, and arcuate radial ends eccentric to each other and with their respective centers located between said ends, said centers being on opposite sides of the center of gravity of the sprag.

CARL K. DAVIS.

REFERENCES CITED

The following references are of record in the file of this patent:

UNITED STATES PATENTS

| Number | Name | Date |
|---|---|---|
| 1,542,040 | De Lavaud | June 16, 1925 |
| 1,694,377 | De Lavaud | Dec. 11, 1928 |
| 1,783,854 | Morse | Dec. 2, 1930 |
| 2,268,376 | Dodge | Dec. 30, 1941 |
| 2,388,424 | Lund | Nov. 6, 1945 |

FOREIGN PATENTS

| Number | Country | Date |
|---|---|---|
| 637,610 | France | Feb. 6, 1928 |